(12) United States Patent
Harada et al.

(10) Patent No.: US 11,516,868 B2
(45) Date of Patent: Nov. 29, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/960,708

(22) PCT Filed: Jan. 11, 2018

(86) PCT No.: PCT/JP2018/000447
§ 371 (c)(1),
(2) Date: Jul. 8, 2020

(87) PCT Pub. No.: WO2019/138489
PCT Pub. Date: Jul. 18, 2019

(65) Prior Publication Data
US 2020/0337103 A1 Oct. 22, 2020

(51) Int. Cl.
*H04W 4/00* (2018.01)
*H04W 76/18* (2018.01)
*H04W 76/27* (2018.01)

(52) U.S. Cl.
CPC .......... *H04W 76/18* (2018.02); *H04W 76/27* (2018.02)

(58) Field of Classification Search
CPC ..... H04W 76/00; H04W 76/10; H04W 76/14; H04W 76/15; H04W 76/16; H04W 76/18; H04W 76/19; H04W 76/20; H04W 76/27; H04W 76/28

USPC ......................................................... 370/328
See application file for complete search history.

(56) References Cited

U.S. PATENT DOCUMENTS

| 2013/0324140 A1 | 12/2013 | Kwon et al. |
| 2017/0048736 A1* | 2/2017 | Marinier ............... H04W 24/08 |
| 2019/0229980 A1* | 7/2019 | Han ....................... H04W 4/70 |

OTHER PUBLICATIONS

International Search Report issued in PCT/JP2018/000447 dated Apr. 10, 2018 (2 pages).
Written Opinion of the International Searching Authority issued in PCT/JP2018/000447 dated Apr. 10, 2018 (5 pages).
Vivo; "RLM / RLF in NR"; 3GPP TSG-RAN WG2 Meeting #100, R2-1712753; Reno, USA; Nov. 27-Dec. 1, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Huy C Ho
(74) *Attorney, Agent, or Firm* — Osha Bergman Watanabe & Burton LLP

(57) ABSTRACT

A user terminal includes a receiving section that receives an RRC (Radio Resource Control) connection reconfiguration message including configuration information of a measurement reference signal for a radio link quality in radio link monitoring (RLM), and a control section that controls an RLM behavior concerning the RLM during an RRC connection reconfiguration based on the RRC connection reconfiguration message.

4 Claims, 10 Drawing Sheets

(56) References Cited

OTHER PUBLICATIONS

3GPP TS 38.331 V15.0.0 "3rd Generation Partnership Project; Technical Specification Group Radio Access Network NR Radio Resource Control (RRC) protocol specification (Release 15)" Dec. 2017 (188 pages).
3GPP TSG-RAN WG2 #100; R2-1713860 "RLF signalling for BWP" Samsung; Reno, Nevada; Nov. 27-Dec. 1, 2017 (3 pages).
3GPP TSG RAN WG1 Meeting AH 1801; R1-1800656 "Remaining issues on radio link monitoring for mobility management" NTT Docomo, Inc.; Vancouver, Canada; Jan. 22-26, 2018 (5 pages).
Extended European Search Report issued in European Application No. 18900248.8, dated Jul. 30, 2021 (10 pages).
3GPP TSG-RAN WG2 #65bis; Tdoc-R2-092433 "Evaluation model for Rel-8 mobility performance" NTT Docomo, Inc.; Seoul, Korea; Mar. 23-27, 2009 (9 pages).
3GPP TSG RAN WG1#91; R1-1720280 "Radio Link Monitoring" Samsung; Reno, USA; Nov. 27-Dec. 1, 2017 (2 pages).
Office Action issued in Japanese Application No. 2019-565127; dated Feb. 22, 2022 (7 pages).

* cited by examiner

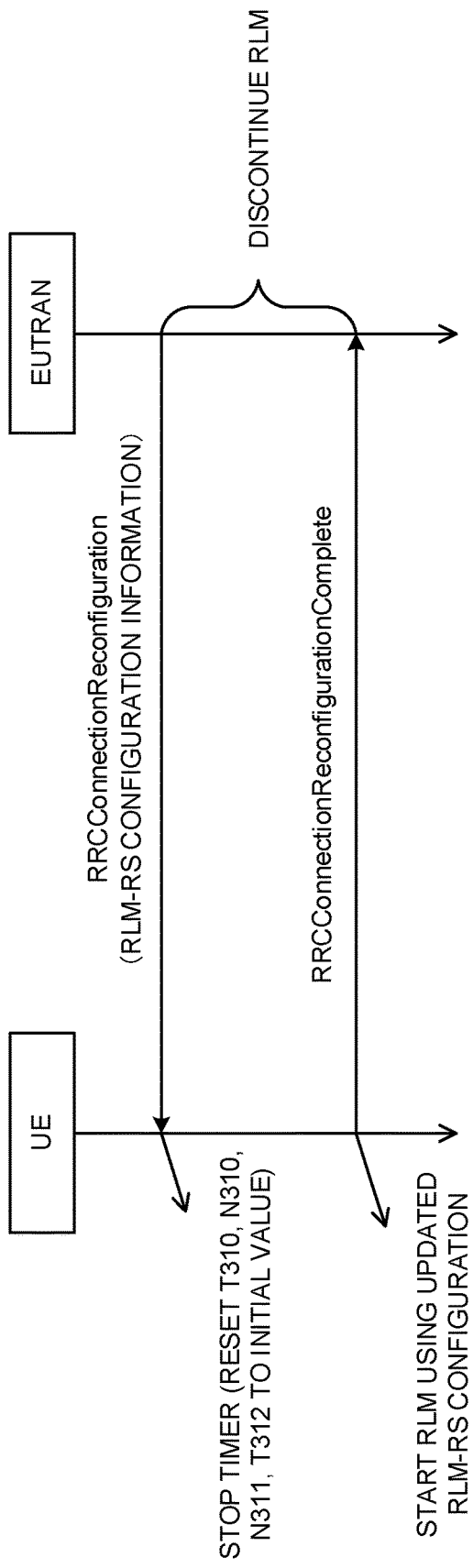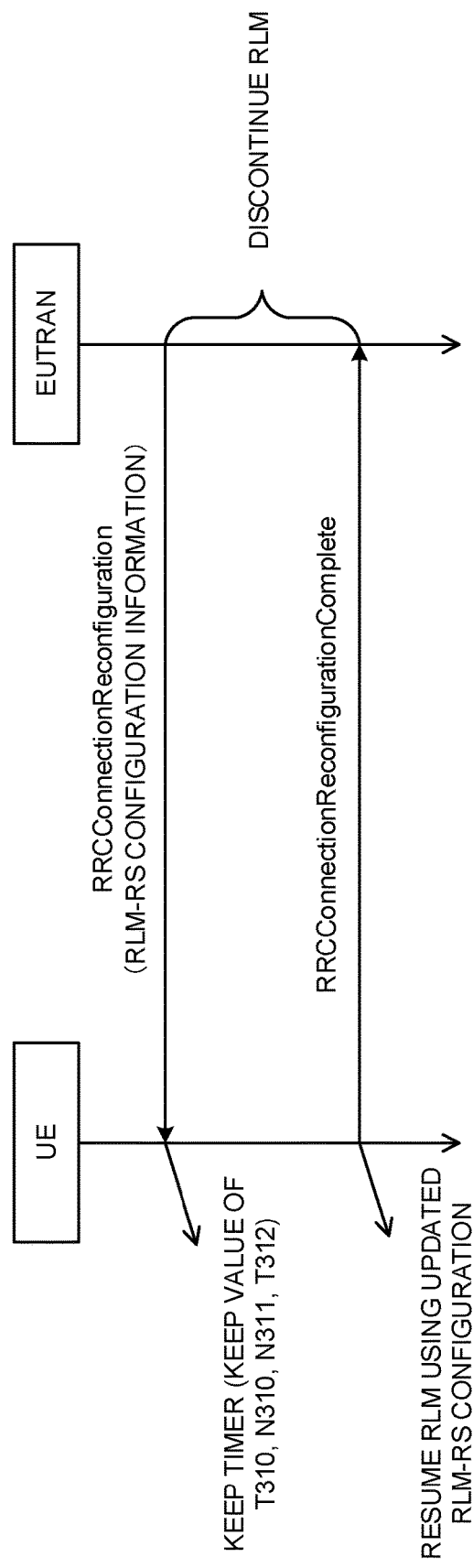

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (LTE Rel. 8 to Rel. 13), monitoring of a radio link quality (radio link monitoring (RLM)) is performed. When the radio link quality measured in the RLM meets a certain condition, a radio link failure (RLF) is detected.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, LTE Rel. 15 or later versions, NR, 5G, 5G+, or the like), it is assumed that reconfiguration of an RRC connection (RRC connection reconfiguration) is required in a case of updating (or changing) a configuration of a measurement reference signal for the radio link quality in the RLM (also referred to as a reference signal for RLM, an RLM-RS (Radio Link Monitoring-Reference Signal) or the like) (RLM-RS configuration).

On the other hand, in the existing LTE systems (for example, LTE Rel. 8 to Rel. 13), it is not assumed that the RRC connection reconfiguration for the RLM-RS configuration is performed. Therefore, in the above future radio communication systems, in the case of the RRC connection reconfiguration for the RLM-RS configuration, an RLM behavior in a user terminal (UE RLM behavior) is not properly controlled during the RRC connection reconfiguration, which may result in that the RLF is not properly detected.

The present invention has been made in light of the foregoing, and has an object to provide a user terminal and a radio communication method capable of properly detecting an RLF in a case that RRC connection reconfiguration for an RLM-RS configuration is performed.

Solution to Problem

A user terminal according to an aspect of the present disclosure includes a receiving section that receives an RRC (Radio Resource Control) connection reconfiguration message including configuration information of a measurement reference signal for a radio link quality in radio link monitoring (RLM), and a control section that controls an RLM behavior concerning the RLM during an RRC connection reconfiguration based on the RRC connection reconfiguration message.

Advantageous Effects of Invention

According to an aspect of the present disclosure, an RLF can be properly detected in a case of an RRC connection reconfiguration for an RLM-RS configuration.

BRIEF DESCRIPTION OF DRAWINGS

FIGS. 2A and 2B are diagrams to show examples of control on an RLM behavior during an RRC connection reconfiguration according to a first aspect;

DESCRIPTION OF EMBODIMENTS

Figure 1:
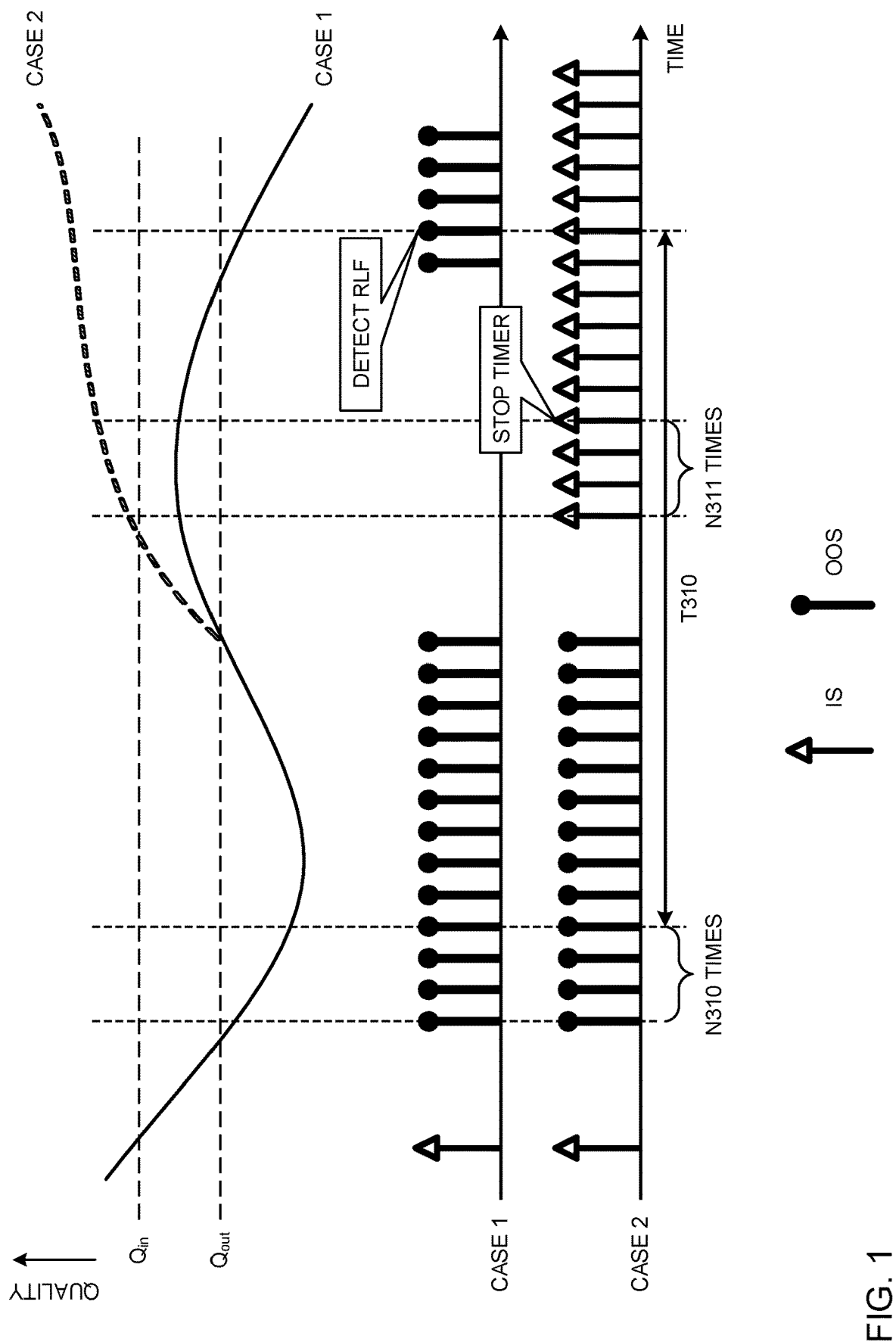
FIG. 1 is a schematic diagram of RLF determination based on IS/OOS.

For future radio communication systems (for example, LTE Rel. 15 or later versions, 5G, 5G+, NR, or the like), a study is underway to use beam forming (BF) to perform communication. In an environment of using the BF, it is assumed that a radio link quality may be deteriorated because of being susceptible to an influence of jamming caused by an obstacle.

The radio link quality deterioration may cause a radio link failure (RLF) to frequently occur. If the RLF occurs, an RRC connection re-establishment (also referred to as a cell re-connection or the like) is required, and hence the frequent RLF occurrence may lead to a system throughput degradation. For this reason, a radio link monitoring (RLM) method suitable to the future radio communication systems is under discussion.

For example, a study is underway to make a measurement reference signal for the radio link quality in the RLM (also referred to as a reference signal for RLM, an RLM-RS (Radio Link Monitoring-Reference Signal) or the like) undefined until being explicitly or implicitly indicated (configured) to a user terminal, that is, a network (for example, a radio base station) indicates (configures) information indicating a configuration of RLM-RS (RLM-RS configuration) (RLM-RS configuration information) to the user terminal.

The RLM-RS may be, for example, at least one of a synchronization signal (including a primary synchronization signal (PSS) and/or a secondary synchronization signal (SSS)), a broadcast channel (PBCH (Physical Broadcast Channel)), a synchronization signal block (SSB, also referred to as a SS/PBCH block or the like) including a synchronization signal and/or a PBCH, a channel state information reference signal (CSI-RS), and the like, or a signal structured by extending and/or changing these signals (for example, a signal structured by changing a density and/or cycle).

A resource for RLM-RS (RLM-RS resource) may include, for example, at least one of a resource and/or port for SSB, and a resource and/or port for CSI-RS (CSI-RS resource). The RLM-RS resource may be associated with a beam used to transmit a certain signal (or, may be in a quasi co-location relationship).

The RLM-RS configuration information may include, for example, information indicating an RLM-RS and/or an RLM-RS resource. The RLM-RS configuration information may be indicated (configured) from a network (for example, the radio base station) to the user terminal through higher layer signaling (for example, RRC signaling).

For example, in a case that a set of SS blocks is used as a the RLM-RS, information indicating the set of SS blocks may be explicitly indicated to the user terminal through RRC signaling.

In a case that a CSI-RS is used as the RLM-RS, information indicating a set of CSI-RS resources may be indicated to the user terminal through RRC signaling. Note that a CSI-RS for RLM-RS may be indicated to the user terminal separately from a CSI-RS for beam management (BM).

The user terminal may be configured with management of the radio link quality using the RLM-RS (RLM-RS resource) through higher layer signaling. It may be assumed that the user terminal configured with the measurement determines whether the radio link is in a synchronized state (IS(In-Sync)) or in an unsynchronized state (OOS (Out-Of-Sync)), based on a measurement result of the radio link quality. In a case that the RLM-RS resource is not configured from the radio base station, a default RLM-RS resource for the user terminal to perform the RLM may be defined in a specification.

In a case that the radio link quality estimated (or measured) based on at least one of the configured RLM-RSs (RLM-RS resources) exceeds a certain threshold $Q_{in}$, the user terminal may determine that the radio link is IS.

In a case that the radio link quality estimated based on at least one of the configured RLM-RSs (RLM-RS resources) is smaller than a certain threshold $Q_{out}$, the user terminal may determine that the radio link is OOS. Note that such a radio link quality may be, for example, a radio link quality corresponding to a block error rate (BLER) of a hypothetical PDCCH.

In the RLM, the IS and/or OOS (IS/OOS) may be indicated from a physical layer to a higher layer (for example, MAC layer, RRC layer, and the like) in the user terminal. The RLF may be determined based on the IS/OOS indication in the user terminal.

Specifically, in a case that the higher layer in the user terminal (for example, RRC layer) receives an OOS indication continuously certain times from a lower layer of a certain cell (for example, L1 or physical layer), the user terminal starts a detection timer for detecting an RLF (detection timer, RLF detection timer) running. Note that since RRC connection re-establishment is started when the RLF is detected, the detection timer may be referred to as a timer for starting RRC connection re-establishment or the like.

In a case that the IS indication is received continuously certain times from the lower layer during the running of the detection timer, the user terminal may stop the detection timer. The user terminal may detect the RLF when the detection timer expires. The user terminal may start an RRC connection re-establishment (re-establishment) procedure when the detection timer expires.

Note that the detection timer for RLF detection may be referred to as a timer T310 in a case of detecting an RLF in the primary cell (PCell), or as a timer T313 in a case of detecting an RLF in a certain cell in the secondary cell group (SCG) (for example, primary secondary cell (PSCell)).

The number of continuous reception times (or a counter indicating the number of continuous reception times) of the OOS indication that is a condition to start the detection timer running may be referred to as N310 (or a counter N310) in the case of the PCell, or N313 (or a counter N313) in the case of the PSCell.

The number of continuous reception times (or a counter indicating the number of continuous reception times) of the IS indication that is a condition to stop the detection timer may be referred to as N311 (or a counter N311) in the case of the PCell, or N314 (or a counter N314) in the case of the PSCell.

FIG. 1 is a diagram to show an example of an RLM behavior in the future radio communication systems. FIG. 1 shows an example of RLF determination based on an IS/OOS indication in the PCell, but RLF determination in a cell other than the PCell can be similarly made. In FIG. 1, it is assumed that N310=N311=4. In FIG. 1, T310 represents a certain time period from start to expiration of the timer T310 running.

In FIG. 1, an upper portion shows two cases (Case 1, Case 2) of a change in the estimated radio link quality. In FIG. 1, a lower portion shows the IS/OOS indications corresponding to the above two cases.

In Case 1, firstly, the OOS occurs N310 times, which causes the timer T310 to start running. After that, T310 expires with the radio link quality not exceeding the threshold $Q_{in}$, and thus, an RLF is detected.

In Case 2, although the timer T310 starts running similarly to Case 1, the radio link quality exceeds the threshold $Q_{in}$ thereafter, and the IS occurs N311 times, causing T310 to stop.

When a measurement report is triggered during the running of the timer T310, the user terminal may start a timer T312 running. In a case that an indication of IS (IS indication) for a certain cell is continuously received N311 times from the lower layer during the running of the timer T312, the user terminal may stop the timer T310. When the timer T312 expires, the user terminal may detect an RLF for the certain cell to start the RRC connection re-establishment procedure.

In the future radio communication systems in which the RLM as described above is expected, it is assumed that if the RLM-RS configuration configured for the user terminal is modified or updated, reconfiguration of the RRC connection (RRC connection reconfiguration) is required.

On the other hand, in the existing LTE systems (for example, LTE Rel. 8 to Rel. 13), the RRC connection reconfiguration is performed in the following cases, for example.

In a case that the RRC connection is modified (for example, establishment, modification, and release of the RRC connection).

In a case of handover.

In a case that the measurement is set up, modified, or released.

In a case that the secondary cell (SCell) is added, modified, or released.

As described above, in the existing LTE systems, the RRC connection reconfiguration is not assumed to be performed for the purpose of modification or update of the RLM-RS configuration. Therefore, in the above future radio communication systems, in the case of the RRC connection reconfiguration for the RLM-RS configuration, an RLM behavior in the user terminal (UE RLM behavior) is not properly controlled during the RRC connection reconfiguration, which may result in that the RLF is not properly detected.

In view of this, the inventors of the present invention focused on that in the case of the RRC connection reconfiguration for the RLM-RS configuration, the RLF can be properly detected by properly defining the RLM behavior during the RRC connection reconfiguration, and have achieved the present invention.

Hereinafter, the present embodiment will be described in detail with reference to the drawings. Note that in the following description, although the above timer T310, N310 (counter N310), N311 (counter N311), and timer T312 are used as examples for description, the present embodiment can be applicable to not only the primary cell but also other cells. In a case of application to other cells, names of a timer and a counter may be adequately modified.

In the RLM according to the present embodiment, the RLF determination is performed as described in FIG. 1, for example, but the RLF determination based on the IS/OOS indication is not limited to that shown in FIG. 1 and may be adequately modified.

The term "during an RRC connection reconfiguration" according to the present embodiment may refer to, for example, a period from when the user terminal receives a message including information on an RRC connection reconfiguration (RRC connection reconfiguration message) from the network (for example, EUTRAN (Evolved Universal Terrestrial Radio Access Network, radio base station (gNB (gNodeB)), or the like) until when the user terminal transmits a message indicating that the RRC connection reconfiguration is completed (RRC connection reconfiguration complete message).

(First Aspect)

In a first aspect, in a case that the user terminal receives an RRC connection reconfiguration message including the RLM-RS configuration information from the network (for example, the radio base station), the user terminal may discontinue the RLM behavior during the RRC connection reconfiguration based on the RRC connection reconfiguration message.

Here, the RLM behavior may be, for example, a control and/or behavior for at least one of the measurement of the radio link quality using the RLM-RS, the IS indication, the OOS indication, the timer T310 (the detection timer for RLF detection), the counter N310 (a first counter indicating the number of continuous reception times of the OOS indication), the counter N311 (a second counter indicating the number of continuous reception times of the IS indication), the timer T312 (the detection timer for RLF detection started running when the measurement report is triggered), and the detection of the RLF.

FIGS. 2A and 2B are diagrams to show examples of control on the RLM behavior according to the first aspect. In FIGS. 2A and 2B, in a case that the user terminal receives the RRC connection reconfiguration message including the RLM-RS configuration information from the radio base station (EUTRAN), the user terminal updates the RLM-RS configuration based on the RLM-RS configuration information.

As shown in FIGS. 2A and 2B, in the case that the user terminal receives the RRC connection reconfiguration message including the RLM-RS configuration information, the user terminal may discontinue the RLM behavior until completing the RRC connection reconfiguration (until transmitting the RRC connection reconfiguration complete message).

Once the user terminal completes the reconfiguration procedure (or transmits the RRC connection reconfiguration complete message), the user terminal may start (resume) the RLM behavior based on the updated RLM-RS configuration.

For example, as shown in FIG. 2A, in the case that the user terminal receives RRC connection reconfiguration message, the user terminal may stop the timer T310 if the timer T310 runs. If the timer T312 runs, the timer T312 may be stopped.

Specifically, when the user terminal stops the timer T310 in FIG. 2A, the user terminal may reset a value of at least one of the timer T310, the counter N310, and the counter N311 to an initial value (for example, 0). When the user terminal stops the timer T312, the user terminal may reset a value of the timer T312 to an initial value (for example, 0).

As shown in FIG. 2A, by resetting the value of at least one of the timer T310, N310, N311, and T312 to the initial value, the user terminal can start the RLM using the updated RLM-RS configuration without based on the RLM using the previous RLM-RS configuration.

On the other hand, as shown FIG. 2B, in the case that the user terminal receives the RRC connection reconfiguration message including the RLM-RS configuration information, the user terminal may keep the value of at least one of the timer T310, the counter N310, the counter N311, and the timer T312 to the value when receiving the RRC connection reconfiguration message while discontinuing the RLM behavior.

In FIG. 2B, in a case that the user terminal resumes the RLM using the updated RLM-RS configuration, the user terminal may make the RLF determination in the RLM using the updated RLM-RS configuration, based on the kept value of at least one of the timer T310, the counter N310, the counter N311, and the timer T312. In this case, the value of at least one of the timer T310, the counter N310, the counter N311, and the timer T312 may be provided with a certain offset value.

The certain offset value may be indicated (configured) to the user terminal through higher layer signaling (for example, RRC signaling). The certain offset value may be controlled based on the number of RLM-RSs commonly configured to cases before and after the update of the RLM-RS configuration (before and after the RRC connection reconfiguration procedure).

For example, the certain offset value may be controlled such that the smaller the commonly configured number of RLM-RSs, the more largely decreases (or the smaller increases) the value of at least one of the timer T310, the counter N310, the counter N311, and the timer T312. On the other hand, the certain offset value may be controlled such that the larger the commonly configured number of RLM-RSs, the smaller decreases (or the more largely increases) the value of at least one of the timer T310, the counter N310, the counter N311, and the timer T312.

As shown in FIG. 2B, the user terminal can start the RLM using the updated RLM-RS configuration, based on the RLM using the previous RLM-RS configuration. By controlling the above certain offset value, a degree of application of the RLM using the previous RLM-RS configuration can be adjusted.

In the first aspect, since the RLM behavior is discontinued during the RRC connection reconfiguration for the update of the RLM-RS configuration, in a case, for example, that the previous RLM-RS configuration is not proper (for example, when a beam failure occurs, or the like), an RLF can be prevented from being erroneously detected by the RLM based on the previous RLM-RS configuration.

(Second Aspect)

In a second aspect, a difference from the first aspect is in that in the case that the user terminal receives an RRC connection reconfiguration message including the RLM-RS configuration information from the network (for example, the radio base station), the user terminal continues the RLM behavior during the RRC connection reconfiguration based on the RRC connection reconfiguration message. In the following, the difference from the first aspect will be mainly described.

Figure 3:
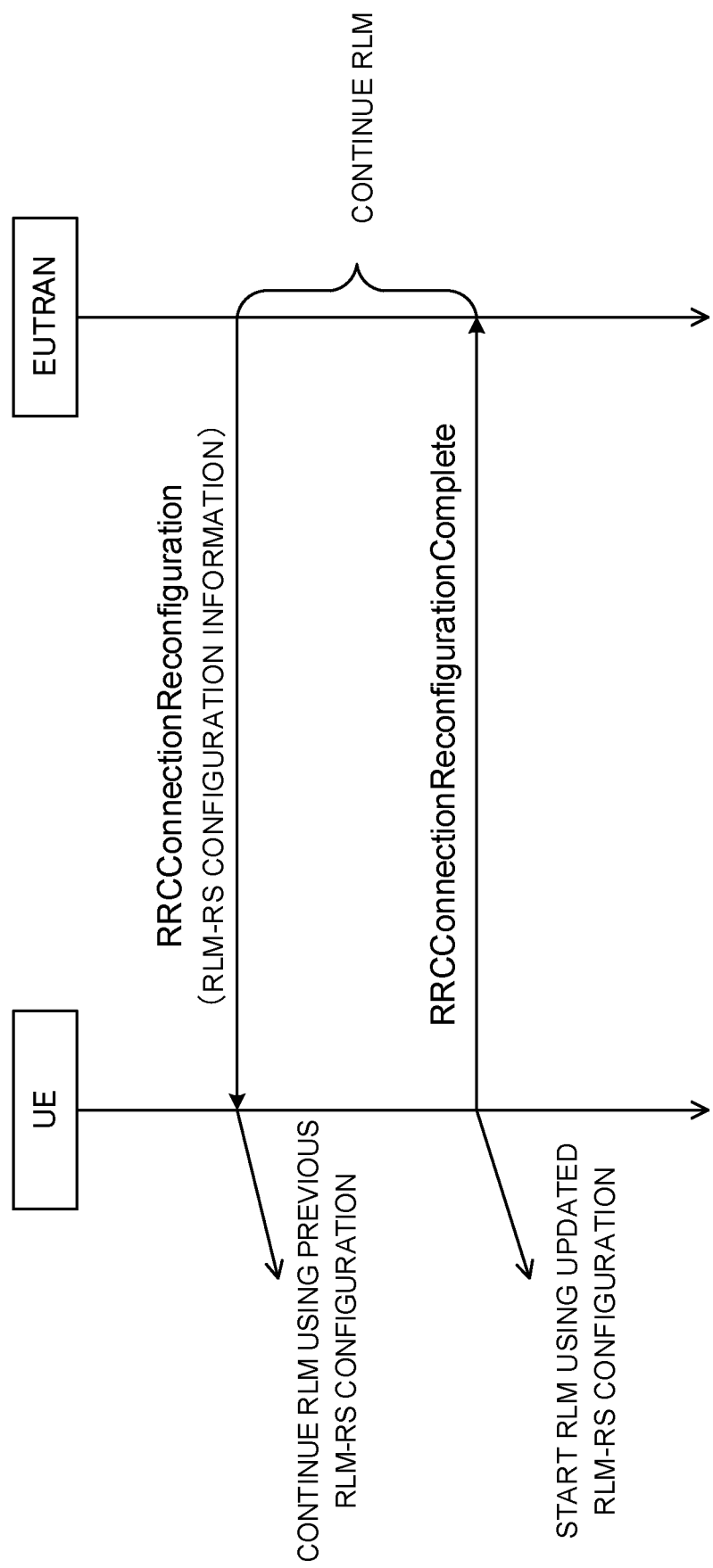
FIG. 3 is a diagram to show an example of control on an RLM behavior during an RRC connection reconfiguration according to a second aspect.

FIG. 3 is a diagram to show an example of control on the RLM behavior according to the second aspect. As shown in FIG. 3, in the case that the user terminal receives the RRC connection reconfiguration message including the RLM-RS configuration information, the user terminal may continue the RLM behavior using the previous RLM-RS configuration until completing the RRC connection reconfiguration (until transmitting the RRC connection reconfiguration complete message).

Once the user terminal completes the reconfiguration procedure (or transmits the RRC connection reconfiguration complete message), the user terminal may start (resume) the RLM behavior based on the updated RLM-RS configuration.

In FIG. 3, in the case that the user terminal resumes the RLM using the updated RLM-RS configuration, the user terminal may make the RLF determination in the RLM using the updated RLM-RS configuration, based on the value of at least one of the timer T310, the counter N310, the counter N311, and the timer T312 using the RLM-RS configuration before the update.

In this case, the value of the timer T310, the counter N310, the counter N311, or the timer T312 using the RLM-RS configuration before update may be used without change for the RLF determination using the updated RLM-RS configuration, or the value of at least one of the timer T310, the counter N310, the counter N311, and the timer T312 may be provided with a certain offset value. The certain offset value is as described in the first aspect.

In the second aspect, since the RLM behavior is continued during the RRC connection reconfiguration for the update of the RLM-RS configuration, in a case, for example, that a portion of the previous RLM-RS configuration is proper (for example, in a case that a portion of the beam is fine, or the like), an RLF can be properly detected.

(Third Aspect)

In a third aspect, in the case that the user terminal receives an RRC connection reconfiguration message including the RLM-RS configuration information from the network (for example, the radio base station), the user terminal may determine the RLM behavior during the RRC connection reconfiguration based on the RRC connection reconfiguration message, based on indication information from the network. The third aspect will be described mainly in differences from the first and second aspects.

Specifically, in the third aspect, in the case of receiving the RRC connection reconfiguration message, whether to discontinue (in the first aspect) or continue (in the second aspect) the RLM during the RRC connection reconfiguration is determined, based on the indication information from the network.

The indication information may be included in the above RRC connection reconfiguration message and the above RLM-RS configuration information, or in other higher layer control information (for example, system information (for example, MIB), broadcast information or RMSI, and the like).

Figure 4:
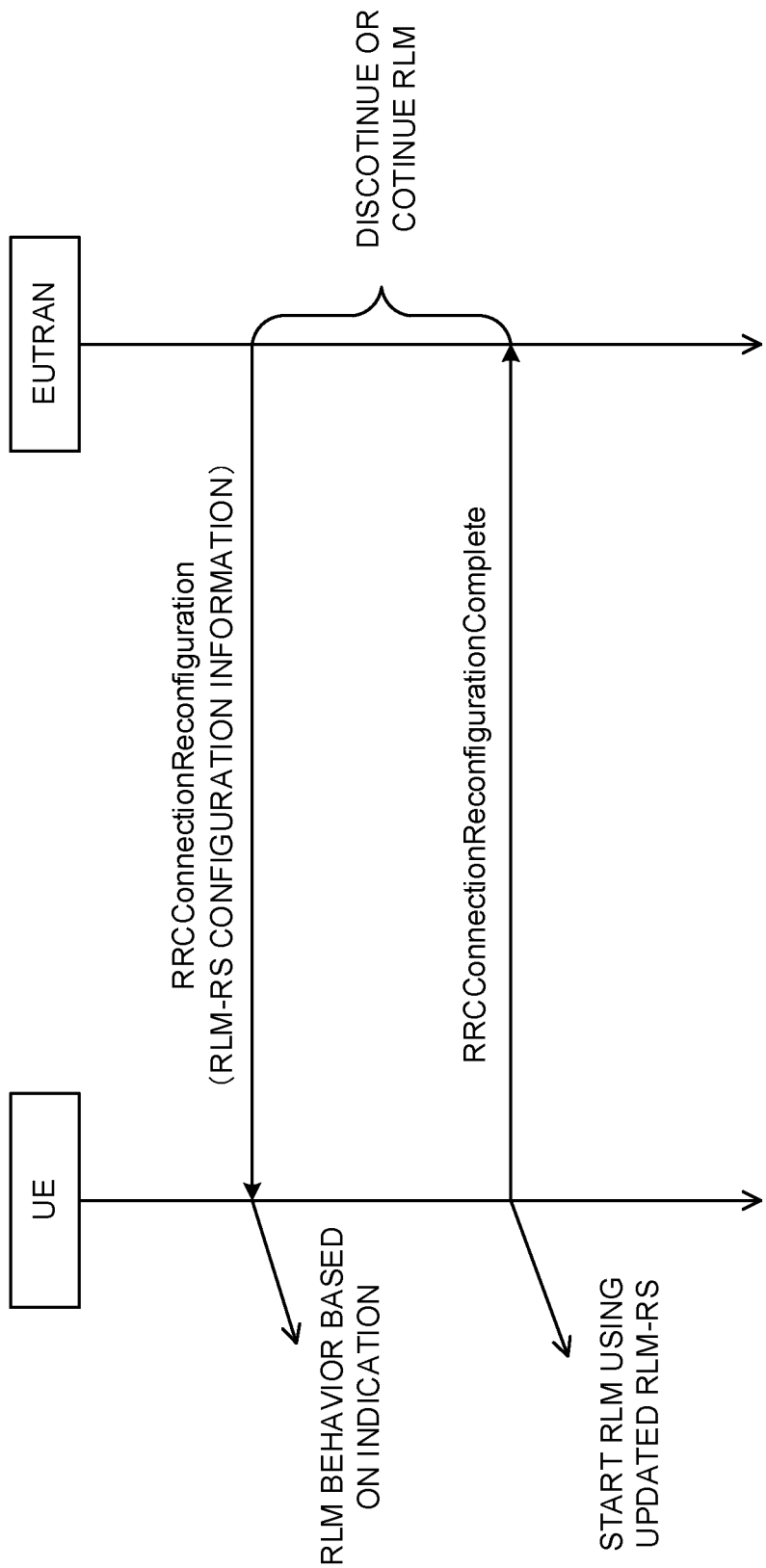
FIG. 4 is a diagram to show an example of control on an RLM behavior during an RRC connection reconfiguration according to a third aspect.

FIG. 4 is a diagram to show an example of control on the RLM behavior according to the third aspect. As shown in FIG. 4, in the case that the user terminal receives the RRC connection reconfiguration message including the RLM-RS configuration information, the user terminal may determine the RLM behavior until completing the RRC connection reconfiguration (until transmitting the RRC connection reconfiguration complete message), based on indication information in the RRC connection reconfiguration message.

For example, in a case that the above indication information indicates discontinuation of the RLM behavior, the user terminal may operate as described in the first aspect. On the other hand, in a case that the above indication information indicates discontinuation of the RLM behavior, the user terminal may operate as described in the second aspect.

In the third aspect, since the RLM behavior is determined based on the indication information from the network during the RRC connection reconfiguration for the update of the RLM-RS configuration, the RLM can be flexibly performed, and for example, an RLF can be properly detected in accordance with a circumstance of the beam management.

(Radio Communication System)

Hereinafter, a structure of a radio communication system according to the present embodiment will be described. In this radio communication system, at least one combination of the above plurality of aspects is used to perform communication.

Figure 5:
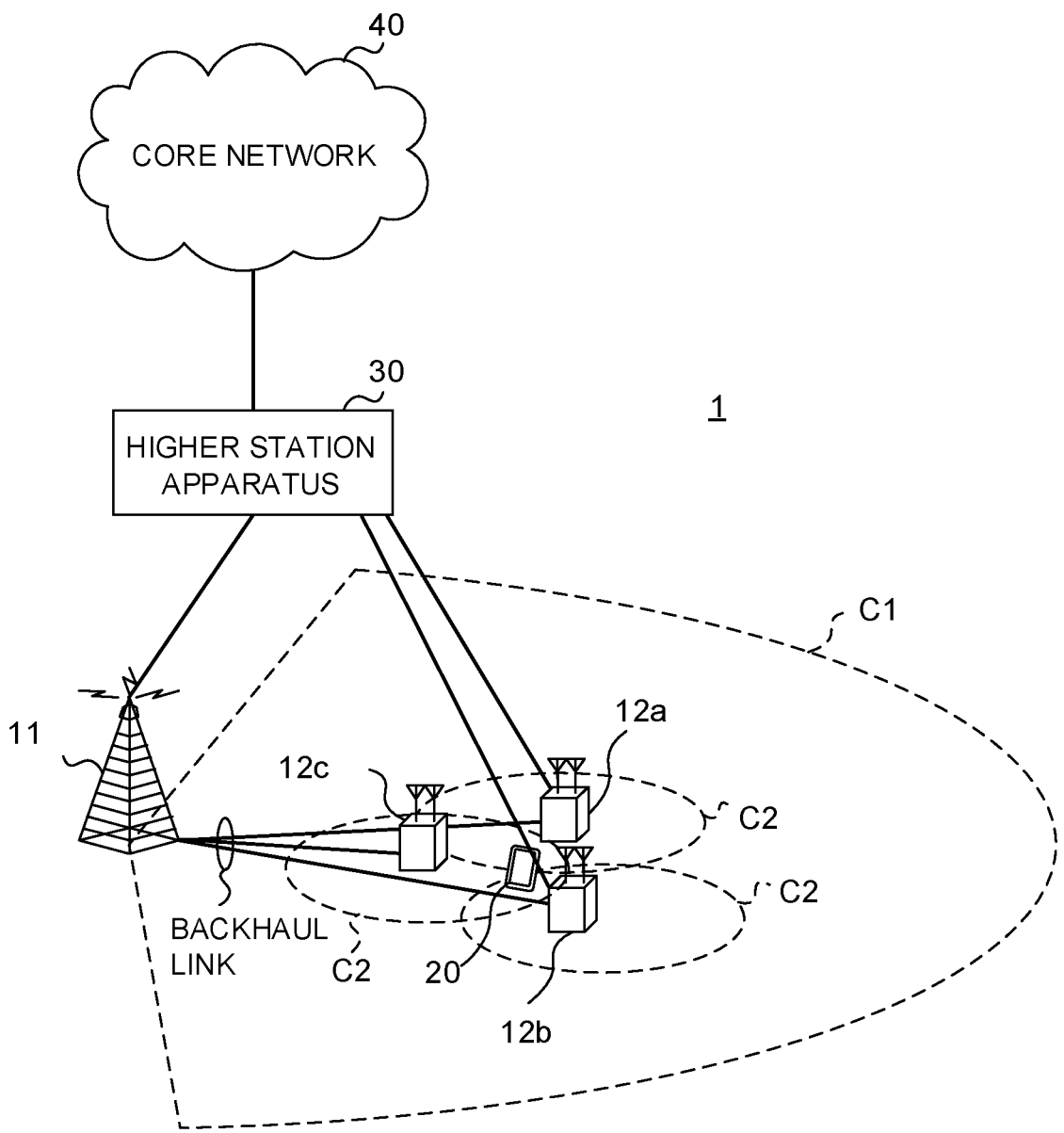
FIG. 5 is a diagram to show an example of a schematic structure of a radio communication system according to the present embodiment.

FIG. 5 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT- Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. Also, the user terminal 20 may adopt the CA or the DC by using a plurality of cells (CCs) (for example, five or less CCs, six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, filter processing, windowing processing, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations,"
"HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of the downlink control channels (PDCCH (Physical Downlink Control Channel) and/or EPDCCH (Enhanced Physical Downlink Control Channel), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. Downlink radio link quality information (CQI (channel quality indicator)), acknowledgment information, a scheduling request (SR), and so on are communicated on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
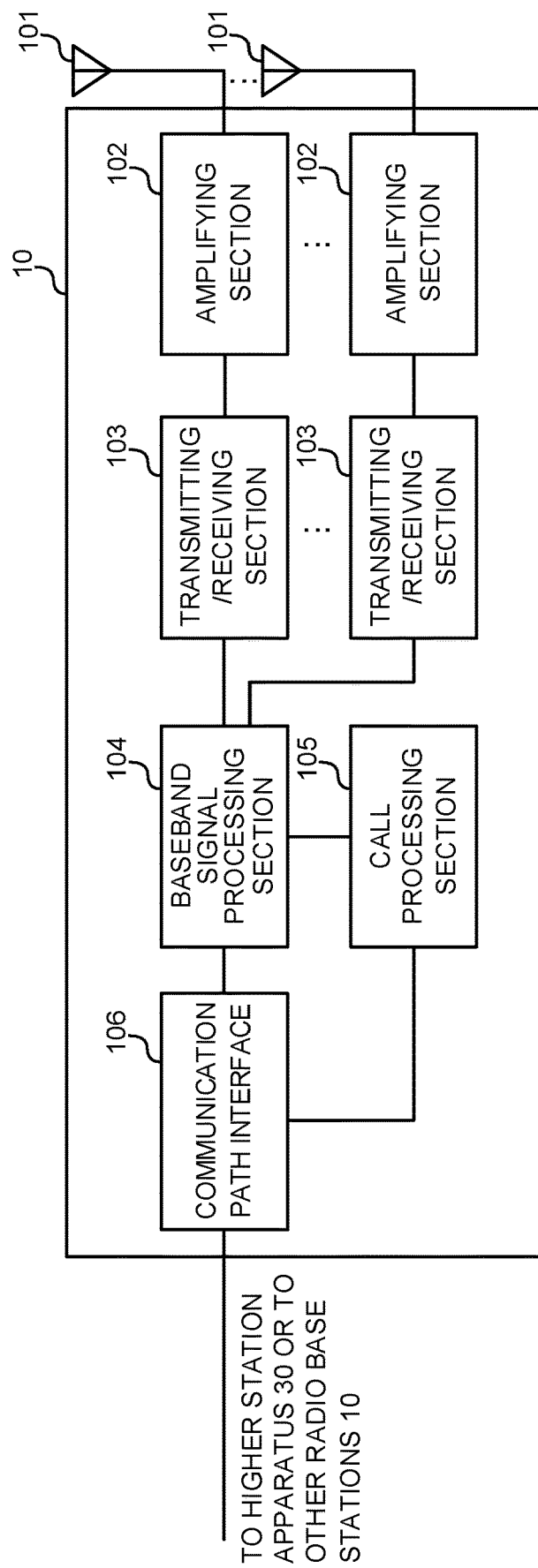
FIG. 6 is a diagram to show an example of an overall structure of a radio base station according to the present embodiment.

FIG. 6 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Note that each transmitting/receiving section 103 may further include an analog beamforming section performing analog beamforming. The analog beamforming section can be constituted with an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 101 can be formed of an antenna array, for example. The transmitting/receiving section 103 is configured to adopt a single BF and a multi BF.

The transmitting/receiving section 103 may transmit a signal using a transmission beam, or may receive a signal using a reception beam. The transmitting/receiving section 103 may transmit and/or receive a signal using a certain beam determined by the control section 301.

The transmitting/receiving section 103 may receive and/or transmit the various kinds of information described in each aspect above from and/or to the user terminal 20. For example, the transmitting/receiving section 103 may transmit the RRC connection reconfiguration message and/or receive the RRC connection reconfiguration complete message. The RRC connection reconfiguration message may include the RLM-RS configuration information.

Figure 7:
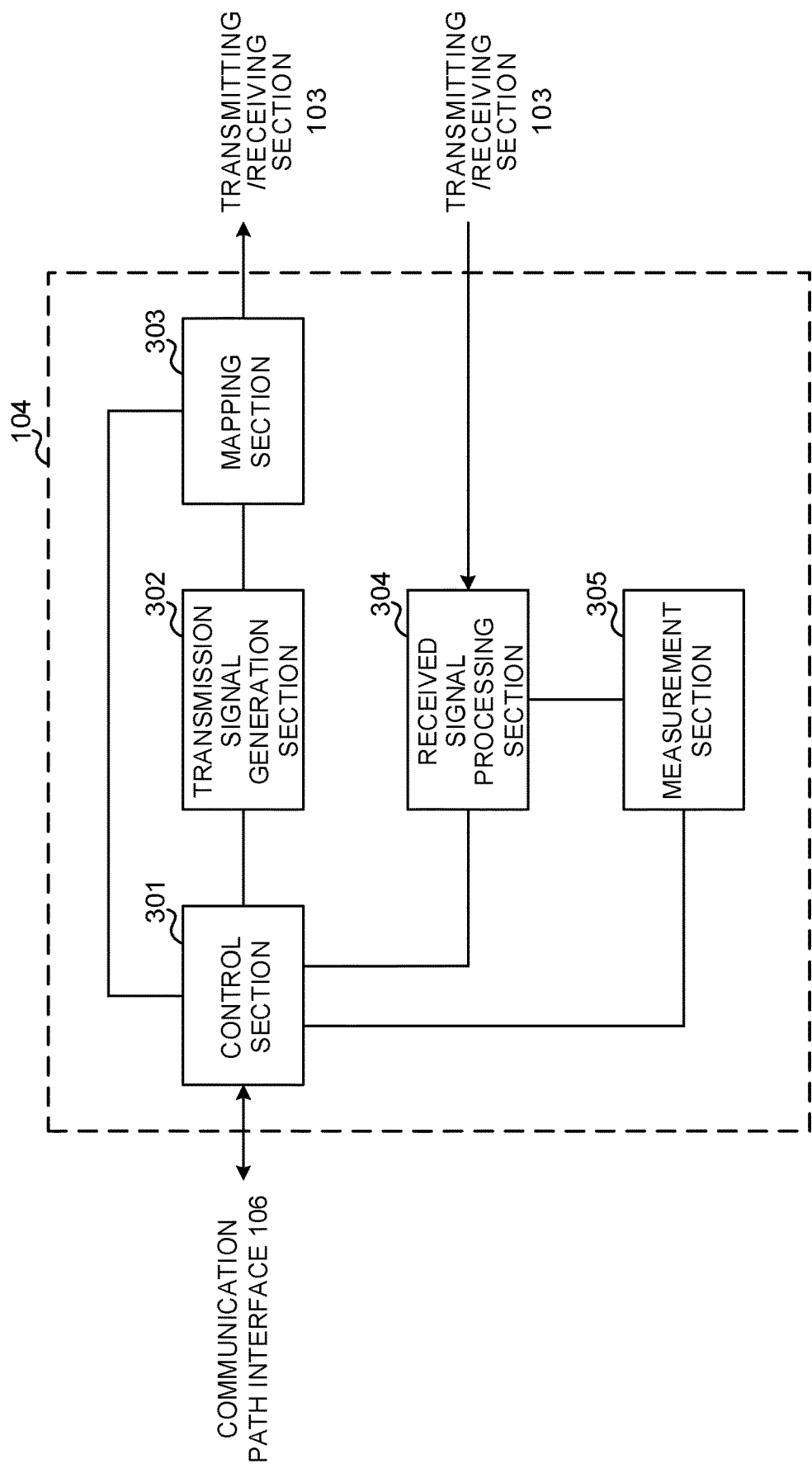
FIG. 7 is a diagram to show an example of a functional structure of the radio base station according to the present embodiment.

FIG. 7 is a diagram to show an example of a functional structure of the radio base station according to the present embodiment. Note that, the present example primarily shows functional blocks that pertain to characteristic parts of the present embodiment, and it may be assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 may control forming the transmission beam and/or the reception beam by using a digital BF by the baseband signal processing section 104 (for example, precoding) and/or an analog BF by the transmitting/receiving section 103 (for example, phase rotation). The control section 301 may control the beam management.

The control section 301 may control the radio link monitoring (RLM) for the user terminal 20. Specifically, the control section 301 may control generation and/or transmission of the configuration information of the measurement reference signal for the radio link quality in the RLM (RLM-RS) (RLM-RS configuration information).

The control section 301 may control at least one of establishment, re-establishment, configuration, and reconfiguration of the RRC connection. Specifically, the control section 301 may control generation and/or transmission of the RRC connection reconfiguration message including the RLM-RS configuration information.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and so on are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 8:
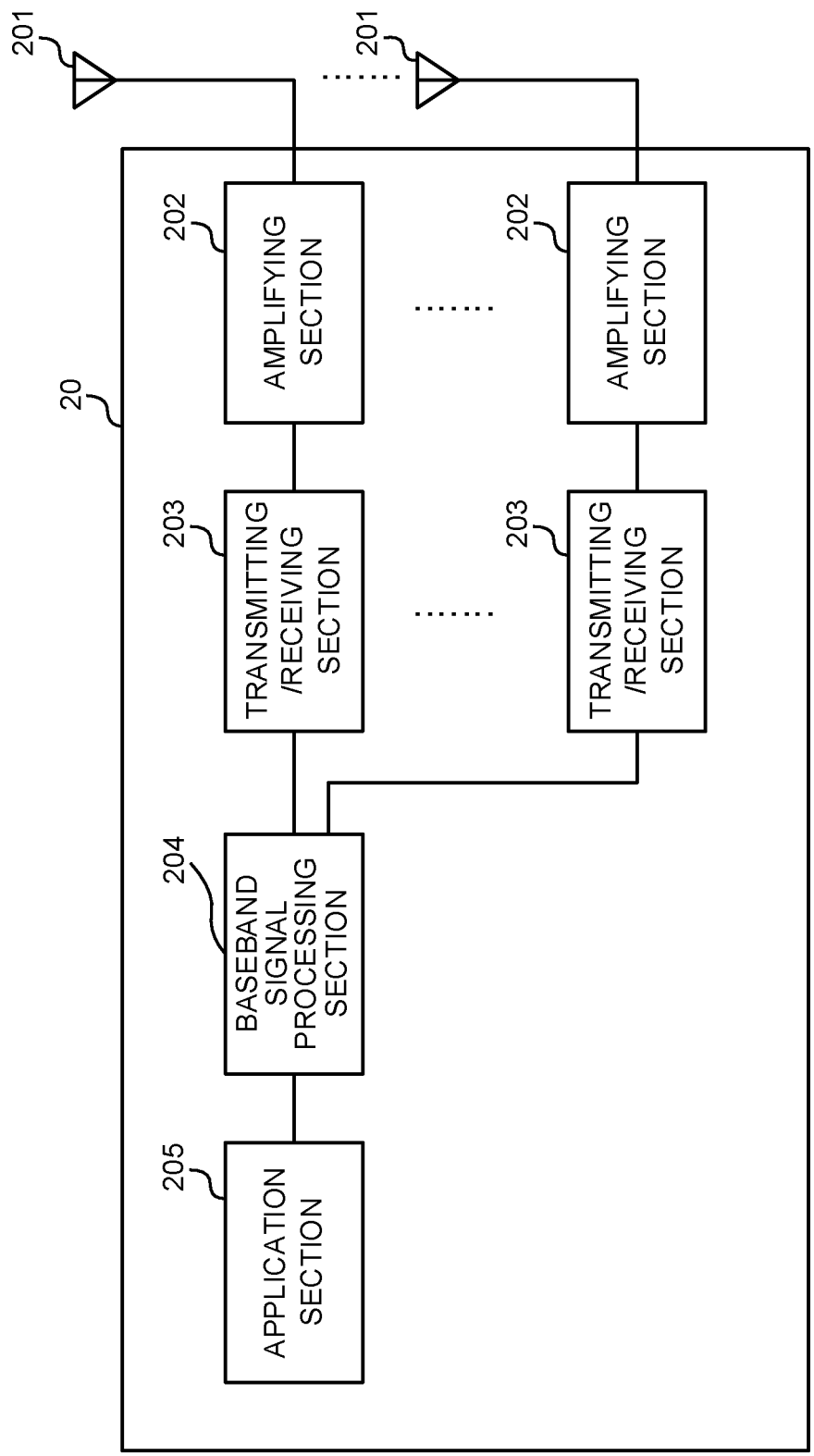
FIG. 8 is a diagram to show an example of an overall structure of a user terminal according to the present embodiment.

FIG. 8 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may include a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that each transmitting/receiving section 203 may further include an analog beamforming section performing analog beamforming. The analog beamforming section can be constituted with an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 201 can be formed of an antenna array, for example. The transmitting/receiving section 203 is configured to adopt a single BF and a multi BF.

The transmitting/receiving section 203 may transmit a signal using a transmission beam, or may receive a signal using a reception beam. The transmitting/receiving section 203 may transmit and/or receive a signal using a certain beam determined by the control section 401.

The transmitting/receiving section 203 may receive and/or transmit the various kinds of information described in each aspect above from and/or to the radio base station 10. For example, each transmitting/receiving section 203 may receive the RRC connection reconfiguration message and/or transmit the RRC connection reconfiguration complete message. The RRC connection reconfiguration message may include the RLM-RS configuration information.

Figure 9:
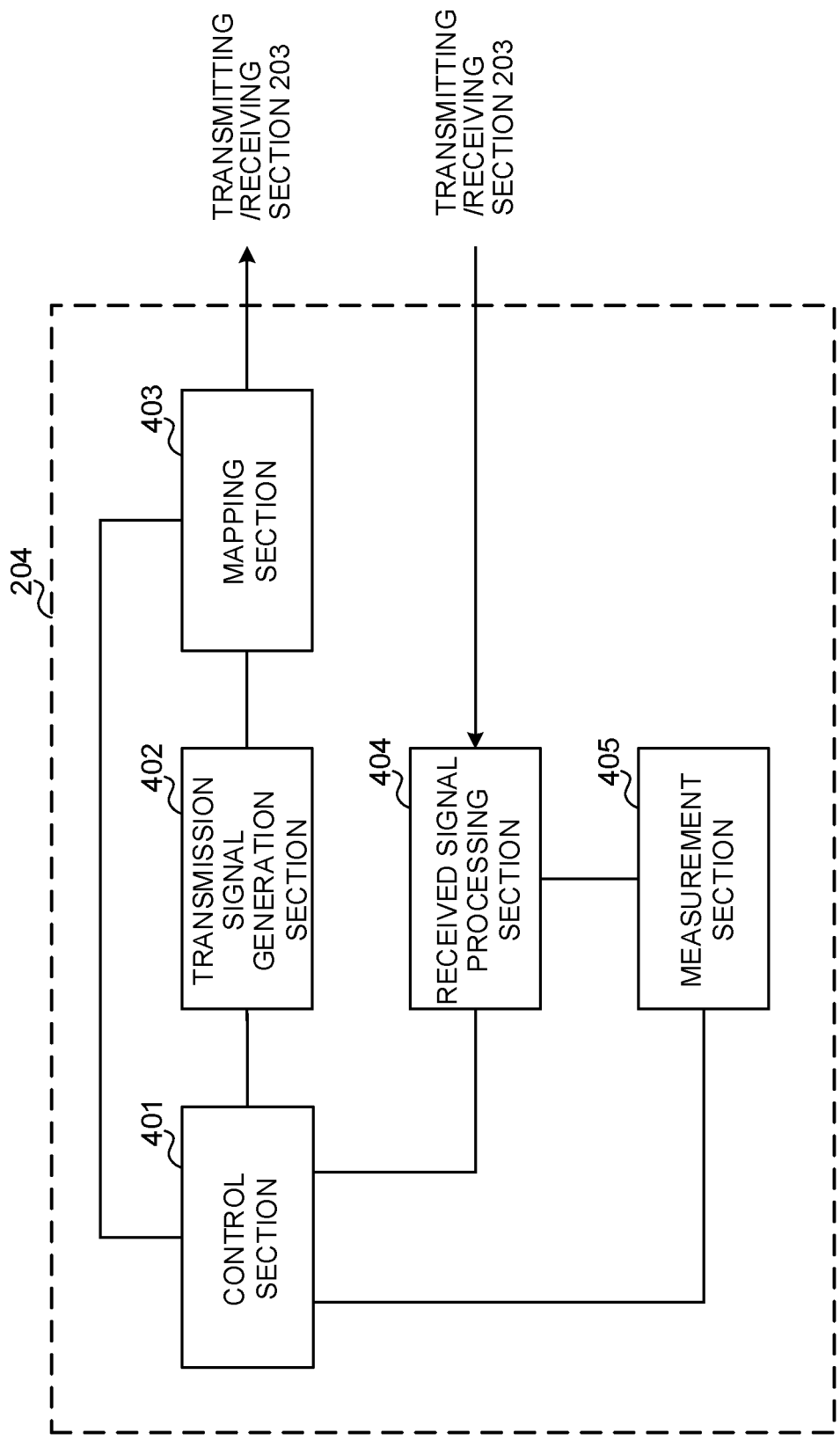
FIG. 9 is a diagram to show an example of a functional structure of the user terminal according to the present embodiment.

FIG. 9 is a diagram to show an example of a functional structure of the user terminal according to the present embodiment. Note that, this example primarily shows functional blocks that pertain to characteristic parts of the present embodiment, and it may be assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control forming the transmission beam and/or the reception beam by using a digital BF by the baseband signal processing section 204 (for example, precoding) and/or an analog BF by the transmitting/receiving section 203 (for example, phase rotation).

The control section 401 may control the radio link monitoring (RLM) and/or beam recovery (BR), based on the measurement result by the measurement section 405.

In a case that an RRC connection reconfiguration message including the RLM-RS configuration information is received by each transmitting/receiving sections 203, the control section 401 control the RLM behavior during the RRC connection reconfiguration based on the RRC connection reconfiguration message.

Specifically, in the case that the RRC connection reconfiguration message is received, the control section 401 may discontinue the RLM behavior during the RRC connection reconfiguration (in the first aspect).

In the case that the RRC connection reconfiguration message is received, the control section 401 may initialize or keep a value of at least one of the detection timer for detecting a radio link failure (RLF), the first counter indicating the number of continuous reception times of the OOS (Out of Sync) indication that is a condition to start the detection timer running, and the second counter indicating the number of continuous reception times of the IS (In Sync) indication that is a condition to stop the detection timer.

In the case that the RRC connection reconfiguration message is received, the control section 401 may continue the RLM behavior using the previous RLM-RS configuration during the RRC connection reconfiguration (in the second aspect).

In the case that the RRC connection reconfiguration message is received, the control section 401 may determine the RLM behavior during the RRC connection reconfiguration, based on the indication information included in the RRC connection reconfiguration message (in the third aspect). Specifically, the control section 401 may determine whether to discontinue or continue the RLM during the RRC connection reconfiguration.

Once the above RRC connection reconfiguration is completed, the control section 401 may control the RLM behavior using the updated RLM-RS configuration information.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
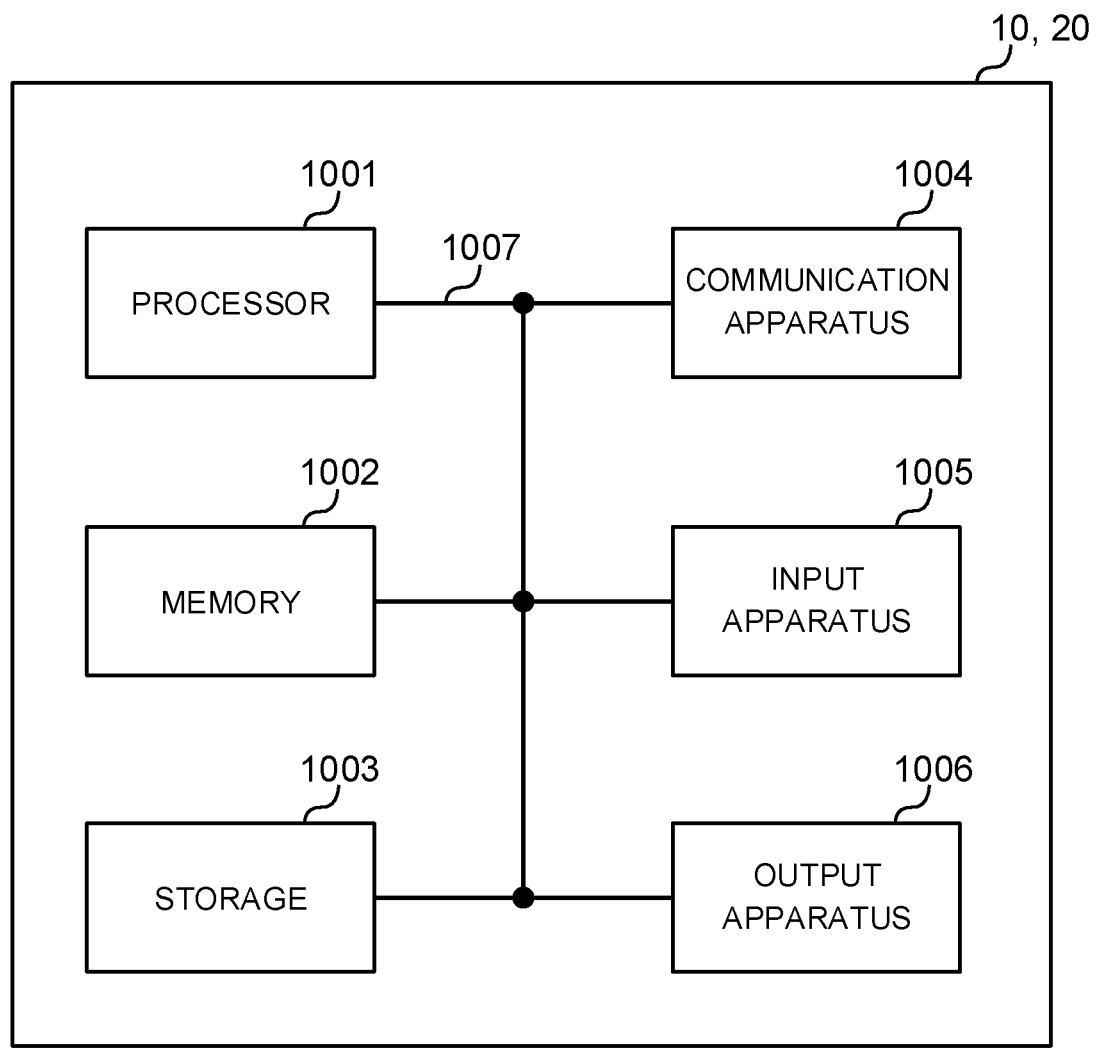
FIG. 10 is a diagram to show an example of a hardware structure of the radio base station and the user terminal according to the present embodiment.

For example, the radio base station, the user terminal, and so on according to the present embodiment may function as a computer that executes the process of each aspect according to the present embodiment. FIG. 10 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the present embodiment described above are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware. (Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiment described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect of the present disclosure/the present embodiment may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/present embodiment described herein may be used individually or in combinations, which may be switched depending on the mode of implementation. The order of processes, sequences, flowcharts, and so on that have been used to describe the aspects/present embodiment described herein may be re-ordered as long as inconsistencies do not arise. For example, although various methods have been illustrated in this specification with various components of steps in exemplary orders, the specific orders that are illustrated herein are by no means limiting.

The aspects/present embodiment described herein may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the present embodiment described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal communicating with a base station apparatus in a first cell and in a second cell by using carrier aggregation, the terminal comprising:
  a receiver that receives a Radio Resource Control (RRC) connection reconfiguration message including information of a Radio Link Monitoring (RLM) reference signal relating to at least one of the first cell and the second cell, the RRC connection reconfiguration message being transmitted from a base station; and
  a processor that controls, based on the RRC connection reconfiguration message, stop of a radio link failure detection timer T310 and reset of a counter N310 indicating reception of an Out of Sync (OOS) for starting the detection timer and reset of a counter N311 indicating reception of In Sync (IS) for stopping the detection timer in at least one of the first cell and the second cell,
  wherein when the RRC connection reconfiguration message includes information about whether or not to stop the detection timer T310, the processor stops the detection timer T310.

2. A radio communication method for a terminal communicating with a base station apparatus in a first cell and in a second cell by using carrier aggregation, the radio communication method comprising:
  receiving a Radio Resource Control (RRC) connection reconfiguration message including information of a Radio Link Monitoring (RLM) reference signal relating to at least one of the first cell and the second cell, the RRC connection reconfiguration message being transmitted from a base station; and controlling, based on the RRC connection reconfiguration message, stop of a radio link failure detection timer T310 and reset of a counter N310 indicating reception of an Out of Sync (OOS) for starting the detection timer and reset of a counter N311 indicating reception of In Sync (IS) for stopping the detection timer in at least one of the first cell and the second cell, wherein when the RRC connection reconfiguration message includes information about whether or not to stop the detection timer T310, the terminal stops the detection timer T310.

3. A base station in a first cell and in a second cell by using carrier aggregation, the base station comprising:
   a transmitter that transmits a Radio Resource Control (RRC) connection reconfiguration message including information of a Radio Link Monitoring (RLM) reference signal relating to the first cell or the second cell; and
   a processor that indicates, by using the RRC connection reconfiguration message, to control stop of a radio link failure detection timer T310 and reset of a counter N310 indicating reception of an Out of Sync (OOS) for starting the detection timer and reset of a counter N311 indicating reception of In Sync (IS) for stopping the detection timer in the first cell or the second cell,
   wherein when the RRC connection reconfiguration message includes information about whether or not to stop the detection timer T310, the detection timer T310 stops.

4. A system comprising a base station and a terminal communicating with the base station in a first cell and in a second cell by using carrier aggregation, wherein:

the base station comprises:
   a transmitter that transmits a Radio Resource Control (RRC) connection reconfiguration message including information of a Radio Link Monitoring (RLM) reference signal relating to the first cell or the second cell; and
   a first processor that indicates, by using the RRC connection reconfiguration message, to control stop of a radio link failure detection timer T310 and reset of a counter N310 indicating reception of an Out of Sync (OOS) for starting the detection timer and reset of a counter N311 indicating reception of In Sync (IS) for stopping the detection timer in the first cell or the second cell; and the terminal comprises:
   a receiver that receives the RRC connection reconfiguration message including the information of the RLM, the reference signal relating to the first cell or the second cell, the RRC connection reconfiguration message being transmitted from the base station; and
   a second processor that controls, based on the RRC connection reconfiguration message, stop of the radio link failure detection timer T310 and reset of the counter N310 indicating reception of the OOS for starting the detection timer and reset of the counter N311 indicating reception of the IS, for stopping the detection timer in the first cell or the second cell,
   wherein when the RRC connection reconfiguration message includes information about whether or not to stop the detection timer T310, the second processor stops the detection timer T310.

* * * * *